US006944654B1

(12) United States Patent
Murphy et al.

(10) Patent No.: US 6,944,654 B1
(45) Date of Patent: Sep. 13, 2005

(54) MULTIPLE STORAGE ARRAY CONTROL

(75) Inventors: Joseph G. Murphy, Westford, MA (US); Ilya Lubovich, Manchester, CT (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/431,758

(22) Filed: Nov. 1, 1999

(51) Int. Cl.$^7$ ............................................. G06F 15/173
(52) U.S. Cl. ...................... 709/223; 709/224; 709/201; 719/331; 719/332
(58) Field of Search ................................ 709/201, 223, 709/203, 224, 315, 316, 331; 707/103 R, 707/102, 101, 103, 103 Y; 719/331, 332

(56) References Cited

U.S. PATENT DOCUMENTS

| 5,459,837 | A | | 10/1995 | Caccavale |
| 5,768,623 | A | * | 6/1998 | Judd et al. ..................... 710/17 |
| 5,778,386 | A | * | 7/1998 | Lin et al. ..................... 700/113 |
| 5,857,102 | A | * | 1/1999 | McChesney et al. ........ 713/100 |
| 5,999,973 | A | * | 12/1999 | Glitho et al. .................. 707/3 |
| 6,009,466 | A | * | 12/1999 | Axberg et al. ............... 345/822 |
| 6,098,128 | A | * | 8/2000 | Velez-McCaskey et al. .. 710/65 |
| 6,128,657 | A | | 10/2000 | Okanoya et al. |
| 6,131,112 | A | * | 10/2000 | Lewis et al. ................. 709/207 |
| 6,148,414 | A | * | 11/2000 | Brown et al. .................. 714/9 |
| 6,209,023 | B1 | * | 3/2001 | Dimitroff et al. ........... 709/211 |
| 6,253,240 | B1 | * | 6/2001 | Axberg et al. ............... 709/223 |
| 6,289,375 | B1 | * | 9/2001 | Knight et al. .................. 707/1 |
| 6,327,614 | B1 | * | 12/2001 | Asano et al. ................ 709/213 |
| 6,330,572 | B1 | * | 12/2001 | Sitka ........................... 707/100 |
| 6,343,324 | B1 | * | 1/2002 | Hubis et al. ................. 709/229 |
| 6,430,611 | B1 | * | 8/2002 | Kita et al. .................... 709/223 |
| 6,480,901 | B1 | * | 11/2002 | Weber et al. ............... 709/246 |
| 6,542,924 | B1 | * | 4/2003 | Abe ........................... 709/208 |
| 6,584,499 | B1 | * | 6/2003 | Jantz et al. .................. 709/220 |
| 6,609,187 | B1 | * | 8/2003 | Merrell et al. .............. 711/173 |
| 6,611,349 | B1 | * | 8/2003 | Vogt et al. .................. 358/1.15 |

FOREIGN PATENT DOCUMENTS

WO     WO 99 53415 A     10/1999

OTHER PUBLICATIONS

Brad Kline, "Distributed File Systems for Storage Area Networks".*
Teigland et al., "An Overview of the Global File System".*
Ira Goodman, "Emerging Network Storage Strategies", Sep. 1999.*

* cited by examiner

Primary Examiner—William C. Vaughn, Jr.
(74) Attorney, Agent, or Firm—Barry W. Chapin, Esq.; Chapin & Huang, LLC

(57) ABSTRACT

A network architecture facilitates the monitoring and control of a number of storage systems (e.g., arrays) by one or more clients. In particular, the network architecture includes at least one storage management server, connected between the storage systems and a number of clients, for providing operation status information associated with the storage systems as well as storage connectivity devices to at least one of the clients.

30 Claims, 4 Drawing Sheets

MULTIPLE STORAGE ARRAY CONTROL

BACKGROUND OF THE INVENTION

The invention relates generally to the control of multiple storage devices, such as disk arrays.

Storage systems have grown enormously in both size and sophistication in recent years. These systems can typically include many large disk drive units controlled by a complex, multi-tasking, disk drive controller such as the EMC Symmetrix disk drive controller. A large scale disk drive system can typically receive commands, such as I/O requests, from a number of host computers and can control a number of disk drive mass storage devices, each mass storage device capable of storing in excess of several gigabits of data.

There is every reason to expect that both the sophistication and the size of the disk drive systems will continue to increase. As the systems increase in complexity, so does a user's reliance upon the system for fast and reliable recovery and storage of data. Accordingly, the user typically uses data throughput and speed of response as a primary criteria for evaluating performance of the disk drive systems. As a result, mass storage devices and the controllers which drive them have become quite sophisticated in trying to improve command response time. Systems such as the EMC Symmetrix disk drive controller system thus incorporate a large cache memory, and other techniques to improve the system throughput.

Of course, with the increase in size and complexity of such disk drive systems, comes a tremendous increase in the number of command requests making monitoring of the performance of the systems more difficult.

SUMMARY OF THE INVENTION

The invention relates to a network architecture which facilitates the monitoring and control of a number of storage systems (e.g., arrays) by one or more clients.

In a general aspect of the invention, the network architecture includes at least one storage management server, connected between the storage systems and a number of clients, for providing operation status information associated with the storage systems to at least one of the clients.

Among other advantages of the storage management server, is the ability for a client to access (e.g., via an Intranet) the storage network and check the status of the storage systems for any problems which might affect throughput of data requested from a particular storage system. As the size of storage systems continue to increase, management responsibilities of the storage systems can become distributed. That is, different users of a system will have different responsibilities with respect to the objects stored within the system. In a storage system or storage array configured in this way, the storage management server facilitates the distribution of these responsibilities. In addition, a client can determine the configuration of the storage system, including the type, properties and status of storage connectivity devices (e.g., hubs, switches) and hosts, as well as, the version of software code or update used by the storage system. Moreover, distribution of the management of the storage systems is completely transparent to the clients.

With networks having numerous host computers connected to a large storage system (e.g., greater than 1 terabyte) a tremendous number of input/output (I/o) requests are being made to and from the host computers at any given time. For example, when used with such networks, the storage management server allows a client to determine that a large number of I/O requests are being made through one channel of the network. The client can then consider the option of running an application using another storage system, thereby improving data throughput.

In another aspect of the invention, two or more storage management servers may be required to manage and distribute the information to clients. Such applications include large storage applications having many storage devices and host computers. In such applications, each storage management server provides information relating to the operation status of the storage devices to the clients.

Embodiments of these aspects of the invention may include one or more of the following features.

The storage management server includes a poller for gathering the information relating to the operation status of the storage devices. Among other responsibilities, the poller polls each of the storage devices at predetermined intervals (as frequently as once per minute) to maintain the current status of the operation of each of the storage devices. Thus, status information for each storage device is guaranteed to be current or "fresh."

The storage management server includes an object store, which serves as a central repository for storing the information relating to the operation status of the storage devices and an object server for distributing the information relating to the operation status of the storage devices to the clients.

The storage management server further includes a security component for limiting access by a client to the information stored at the storage management server. In this way, access privileges to one or more of the storage devices can be limited to a particular user or groups of users. The storage management server further also includes a web server for facilitating communication with the clients, via the Intranet.

Each client further includes a graphical user interface for displaying the information relating to the operation status of the storage devices.

The host computers and storage devices can be of different types. For example, one host computer could be a UNIX-based system, while another is based on Windows NT. Similarly, for example, the storage systems can be different versions of EMC's Symmetrix storage systems.

Where multiple management storage servers are used, the network architecture may further include a naming service, connected to each of the storage management servers, to determine which of the central repositories of the storage management servers includes the information relating to the operation status of the storage devices of interest.

Another aspect of the invention relates to a method of managing a storage system including storage devices, the storage system communicating data to and from host computers. The method includes the following steps. A storage management server is provided between a number of clients and the storage devices. The storage management server collects information relating to the configuration of the storage system and provides that information to at least one of the clients.

Embodiments of this aspect of the invention may include one or more of the following features.

Providing information relating to the operation status of the storage devices includes using a poller to gather the information relating to the operation status of the storage device. The information relating to the operation status of the storage devices is stored in a central repository on the storage management server. An object server distributes the information relating to the operation status of the storage devices to the clients.

A poller is used to poll each of the storage devices at predetermined intervals to maintain the current status of the operation of each of the storage devices.

In certain embodiments, information relating to the operation status of storage connectivity devices, which connect the hosts to the storage devices is also provided.

Other features and advantages of the invention will become apparent from the following description, including the claims and the drawings.

DETAILED DESCRIPTION

Figure 1:
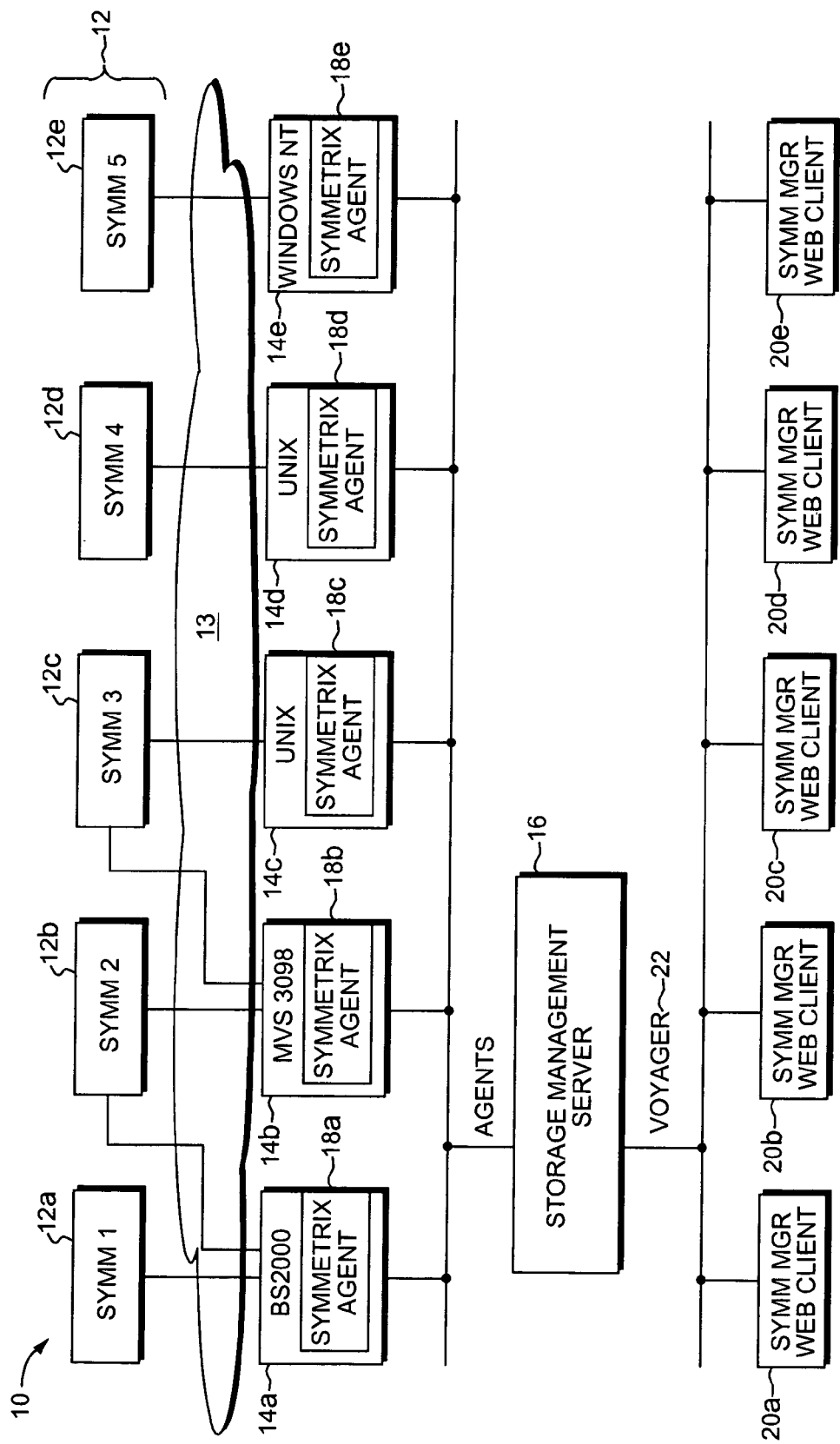
FIG. 1 is a block diagram of a network architecture of the invention.

Referring to FIG. 1, a network architecture 10 includes an enterprise disk storage 12 connected to host computers (hereafter, hosts) 14a–14e through a communications network 13. The term "enterprise" as used here means that the disk storage is configured to allow multiple connectivity by, for example, hosts provided by different vendors. As shown here, disk storage system 12 includes individual storage arrays 12a–12e, which may be, for example, one of a number of different Symmetrix systems, products of EMC Corporation, Hopkinton, Mass. Each of the storage arrays 12a–12e typically has an excess of 1 gigabit of memory and is logically divided, in accordance with known techniques, into a plurality of logical volumes. Each storage array 12a–12e can thus have a plurality of logical volumes, for example, four, eight, or more logical volumes in a single physical disk drive element. Details concerning the architecture and operation of these systems are found, for example, in Symmetrix Product Manuals for Models 5500, 52XX, 5100, 3500, 32XX, and 3100) all of which are incorporated herein by reference.

The communications network may be, for example, a Fibre channel network allowing any of host computers 14a–14c to communicate with any of storage arrays 12a–12e. Fibre channel network may be configured as a loop, a fabric having hubs or switches, or combinations of both. The hubs or switches represent storage connectivity devices for forwarding data packets to appropriate ports based on the address of the packet.

Interconnecting the hosts 14a–14e and the storage arrays 12a–12e are disk drive controllers (not shown), for example, that which is manufactured by EMC Corporation and known as the Symmetrix controller.

Network architecture 10 also includes a storage management server 16 which is connected to and communicates with each of the hosts 14a–14e via an appropriate agent 18a–18e stored on the host. As is known in the art, an agent is a program that performs information gathering or processing in the background. In particular, each agent 18a–18e has the well-defined task of gathering and providing information to management server 16 associated with the operation status of the storage array associated with the host running the agent. As will be described in greater detail below, management server 16 stores and makes accessible to a number of clients 20a–20e the operation status information of the storage arrays. Clients 20a–20e communicate with management server 16 through an on-line object request broker 22 (e.g., Voyager ORB, a product of Object Space, Inc., Dallas, Tex.). Object request broker 22 serves as a remote access adapter interface for ensuring that a client is able to access management server 16. Other object request brokers 22 including RMI and CORBA are equally suitable for use for linking a client to management server 16. Thus, clients 20a–20e can monitor the status of any or all storage arrays 14a–14e from virtually anywhere in the world, or at least where Intranet access is available. In particular, each of clients can independently access management server and determine the status of any or a number of storage systems 12a–12e. For example, a client 20a can determine whether throughput problems exist between host 14b and storage arrays 12b and 12c. Further, client 20a can determine the configuration of storage array 12e including the version of software code or update used by that storage system.

Figure 2:
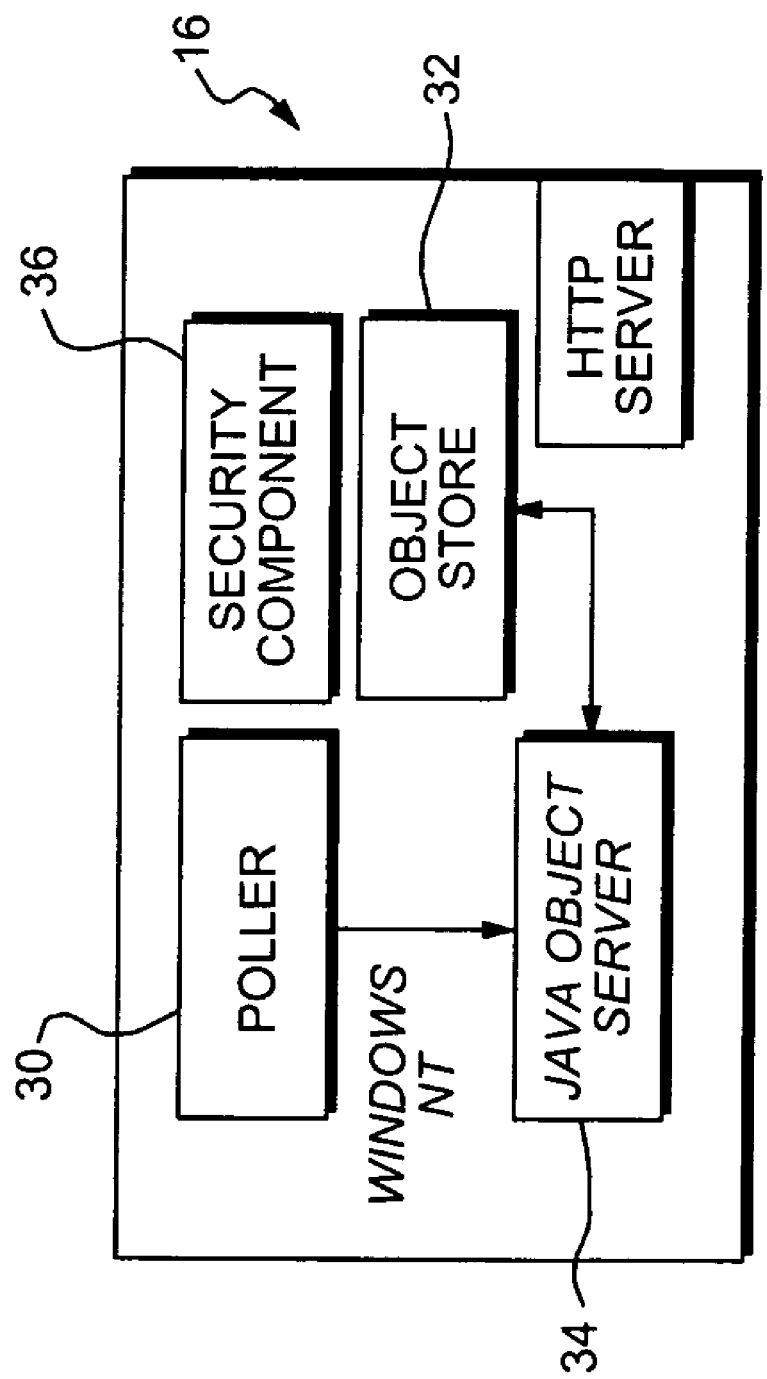
FIG. 2 is a block diagram of the storage management server of the network architecture of FIG. 1.

Referring to FIG. 2, storage management server 16 includes a poller 30 which has the primary function of retrieving the pertinent information about each of storage arrays 12a–12e. Upon initiation of management server 16, poller 30 will poll for and "discover" all connected hosts, storage arrays, and storage connectivity devices (e.g., Fibre Channel, hubs, switches). Poller 30 will then begin monitoring basic status of the arrays, including how the storage arrays are defined and grouped, as well the status of communication with agents 18a–18e. The frequency of polling can be selected by the client or, if not defined, be set to a default value (e.g., every minute.) The discovery process should also include retrieval of the storage array configuration information.

Once retrieved, the configuration information is stored (in object format) in Object Store 32 and poller 30 polls the appropriate agent for a configuration change date and time. Upon recognizing a configuration change, poller 30 will retrieve a current or "fresh" copy of the configuration. Poller 30 will also notify the Object Server 34 (here, a Java Object Server), which is responsible for notifying registered clients of the new configuration. Of course, whenever poller 30 requests a status update of configuration, it will poll for additional agents and storage arrays which may have been recently added.

Object Store 32 maintains persistence on its stored objects. Persistence is maintained for current status and configuration information for each storage array connected to the network. In addition, statistical information may be stored for all or selected ones of the storage arrays.

Object Server 34 uses a security component 36 to first validate user ID codes and passwords from a client, and will then retrieve from Object Store 32, the current status of all storage arrays that the user is authorized to view. Object Server 34 updates the client with any new data until the client "unregisters."

Storage management server 16 can optionally include an HTTP server (web server) 38, which is used to establish initial connection with clients 20a–20e. In essence, HTTP server 38 allows clients to establish connection using the address of the HTTP server rather than the proxy (e.g., Voyager) address.

Figure 3:
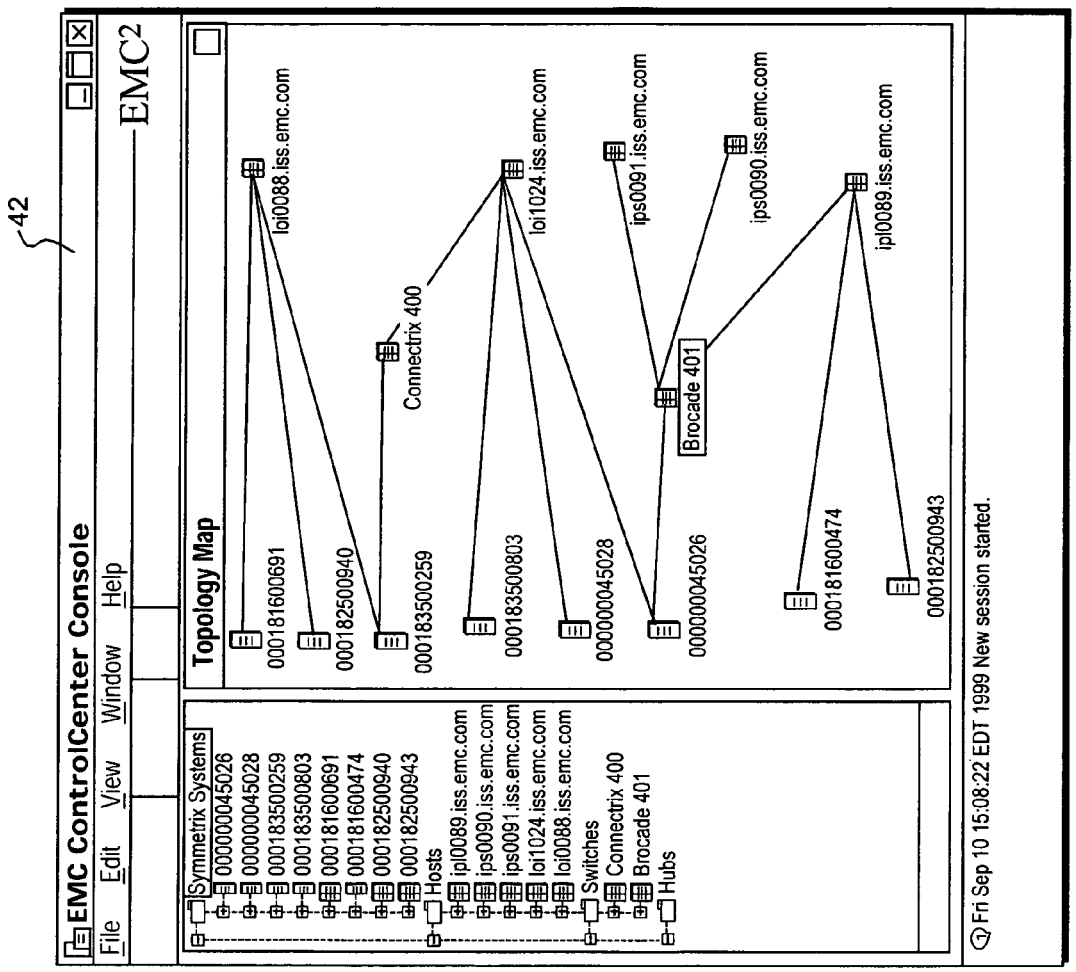
FIG. 3 is an example of a display screen of the graphical user interface for accessing the storage management server of FIG. 1.

Referring to FIG. 3, an example of an operator display screen 40 of the graphical user interface is shown. Display screen 40 includes a Java applet window 42 contained within a web-browser window 44 (here, NetScape). Within applet window 42 are several sub-windows, including a site sub-window 46 which lists the storage arrays accessible by the user, while a session sub-window 48 provides the status information of the current session. Sub-window 50 provides a graphical representation showing the grouping and hierarchy of the storage arrays, so that the user is able to quickly understand the connectivity relationship of the storage arrays of interest.

Figure 4:
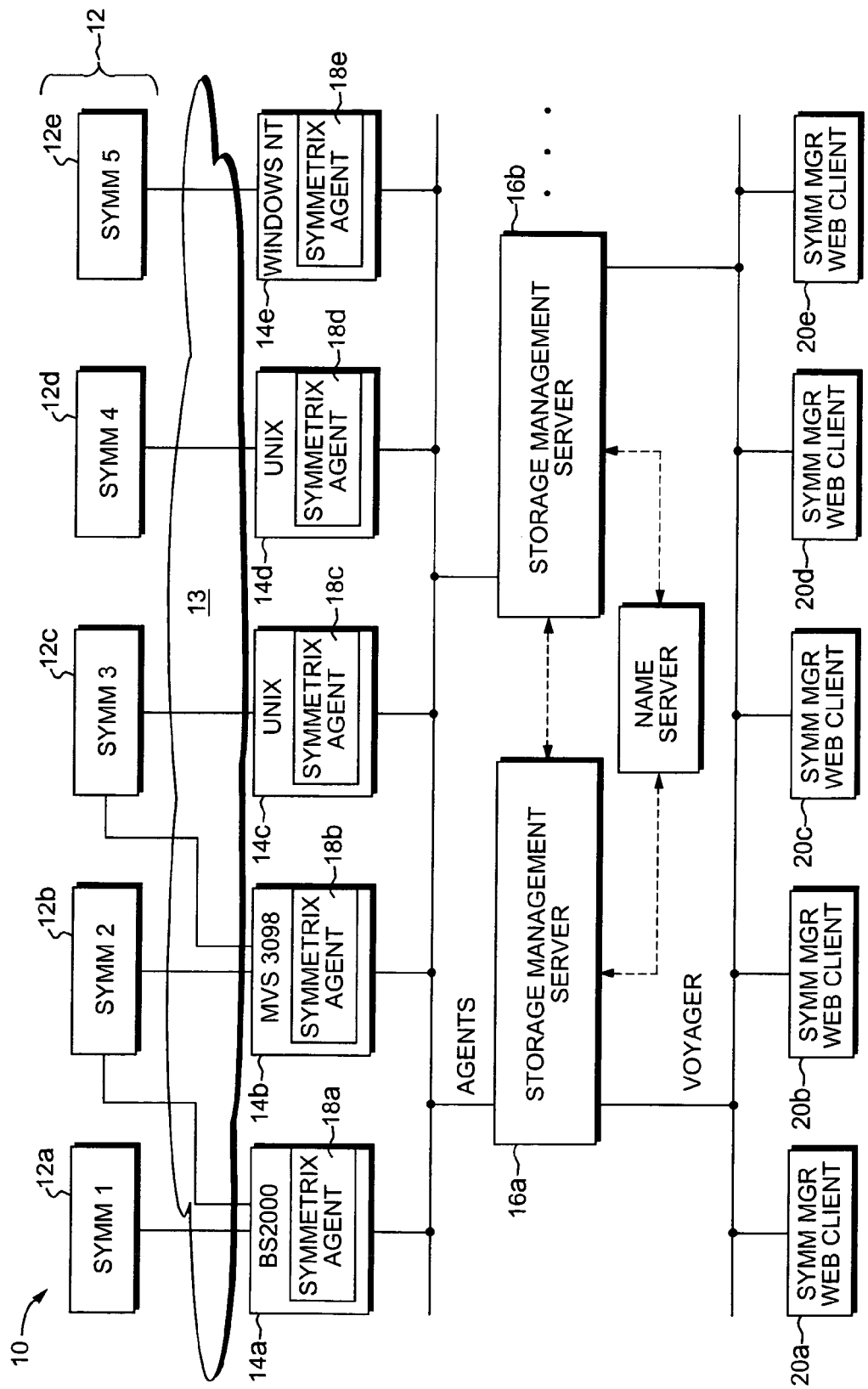
FIG. 4 is an alternative embodiment of a network architecture of the invention.

Referring to FIG. 4, in another embodiment, two or more storage management servers 16a, 16b can be used to distribute the monitoring load of the storage arrays. Each management server includes the structure and provides the functionality shown in FIG. 2 as described above. In these applications, however, because multiple management servers are used, a name server 60 is provided to help manage the distribution of the management resources. In particular, name server 60 determines which of the Object Stores of storage management servers 16a, 16b includes the information relating to the operation status of the storage arrays of interest. Note that from the viewpoint of clients 20a–20e, the use of multiple management servers is invisible.

Other embodiments are within the scope of the claims. For example, in the above description, the storage management server is used in conjunction with a Symmetrix enterprise disk storage system. It is important to appreciate that the storage management server is equally applicable in use with other storage area networks and other storage devices, including those that are not Symmetrix devices.

What is claimed is:

1. A network architecture for management of a storage area network by at least one client which is independent of the storage area network, the network architecture comprising:
   a storage system including a plurality of storage devices;
   a plurality of host computers connected to the storage system through a first communications network, the host computers including corresponding agents for gathering operation status information associated with the storage area network;
   at least one storage management server in communication with the plurality of host computers via the corresponding agents to retrieve the operation status information, the at least one storage management server being adapted to communicate with the at least one client via a web-based second communications network; and
   the at least one storage management server providing the operation status information received from the corresponding agents to the at least one client via use of the web-based second communications network and an object request broker in the at least one storage management server for ensuring that the at least one client is able to access the at least one storage management server, wherein the at least one storage management server further provides information relating to an operation status of storage connectivity devices, which connect storage devices to the host computers, based on communications with the agents; and the at least one storage management server including:
   a poller for gathering information relating to an operation status of the storage devices and the storage connectivity devices; and
   a central repository for storing the operation status information;
   an object server for distributing the information relating to an operation status of the storage devices and storage connectivity devices to the at least one client.

2. The network architecture of claim 1 wherein the poller polls the corresponding agents at predetermined intervals to maintain a current status of an operation of the storage devices.

3. The network architecture of claim 2 wherein the predetermined intervals are less than one minute.

4. The network architecture of claim 1 wherein the at least one storage management server further includes a security component for limiting access by the at least one client to the storage devices.

5. The network architecture of claim 1 wherein the at least one storage management server further includes a web server for communicating with the at least one client.

6. The network architecture of claim 1 wherein each of the at least one client includes a graphical user interface for displaying information relating to an operation status of the storage devices.

7. The network architecture of claim 1 wherein the at least one host computer includes a plurality of host computers, the host computers running different types of operating systems.

8. The network architecture of claim 1 wherein the plurality of storage devices are of different types.

9. The network architecture of claim 1 further comprising a plurality of storage management servers, each connected between the host computers and a plurality of clients, each storage management server providing information relating to an operation status of the storage devices to the plurality of clients.

10. The network architecture of claim 1 wherein the at least one management server includes at least two management servers each of the at least two one storage management servers including:
    a poller for gathering the operation status information relating to an operation status of the storage devices;
    a central repository for storing the operation status information; and
    an object server for distributing the information relating to the operation status of the storage devices to the at least one client, wherein the object server and the at least one client communicate via use of the object request broker.

11. The network architecture of claim 10, wherein the at least one storage management server includes a plurality of storage management servers, the network architecture further comprising a name server, which is connected to communicate with the plurality of storage management servers to determine which central respository of the plurality of storage management servers includes information relating to an operation status of a given one of the storage devices.

12. The network architecture of claim 1 wherein the second communications network is an Intranet.

13. The network architecture of claim 1 wherein the first communications network is a Fibre Channel network.

14. A method of managing a storage area network by at least one client independent of the storage area network, the storage area network including:
    a storage system including a plurality of storage devices;
    a plurality of host computers connected to the storage system through a first communication network, each host computer capable of transmitting data to and retrieving data from at least one of the plurality of storage devices;
    the method comprising:
    providing a storage management server between the at least one client and the plurality of storage devices, the storage management server being adapted to connect to the at least one client via a web-based second communication network and being in communication with the plurality of host computers via corresponding agents in the host computers;

at the storage management server: i) gathering information relating to an operation status of the plurality of storage devices and the storage connectivity devices based on communications with the corresponding agents, the storage connectivity devices connecting the host computers the storage devices, and ii) storing the operation status information in a central repository;

via an object server of the storage management server, distributing the operation status information relating to an operation status of the storage devices and the storage connectivity devices to the at least one client; and wherein the storage management server and the at least one client communicate via an object request broker in the storage management server for ensuring that the at least one client is able to access the storage management server.

15. The method of claim 14 further comprising polling the storage devices at predetermined intervals to maintain a current status of the configuration of the storage system.

16. The method of claim 14 wherein the second communications network is an Intranet.

17. The method of claim 14 wherein the first communications network is a Fibre Channel network.

18. A method as in claim 14, wherein the operation status information indicates that a particular channel in the storage area network is inundated with traffic as a result of a large number of I/O (Input/Output) requests, the method further comprising:

notifying a given client of the at least one client about an occurrence of the large number of I/O requests, the given client, in turn, opting to run an application using another storage system to improve data throughput.

19. A method as in claim 14 further comprising:

via the storage management server, providing the operation status information to the at least one client, facilitating distribution of management responsibilities among multiple clients, which have different responsibilities and access rights with respect to objects in the central repository of the management server.

20. A method as in claim 19, wherein the operation status information includes at least one of type, properties and status of storage connectivity devices in the storage network.

21. A method as in claim 14, wherein distributing the operation status information enables a client of the at least one client to check a status of resources of the storage area network that affects a throughput of data requested from the plurality of storage devices.

22. A method as in claim 14 further comprising:

via the storage management server, operating in conjunction with another storage management server to manage and distribute operation status information to the at least one client.

23. A method as in claim 14 further comprising:

providing a naming service to determine whether the storage management server, which is part of a group of storage management servers, includes information relating to a storage device of interest as specified by a particular client.

24. A method as in claim 14 further comprising:

limiting access to the operation status information in the management server to clients with appropriate privileges.

25. A method as in claim 14, wherein the storage network includes connectivity devices for forwarding data packets, between the host computers and the storage devices, to appropriate ports based on addresses of the data packets; and wherein retrieving the operation status information from the host computers includes initiating communication with the host computers to discover a configuration associated with at least one of the host computers, storage devices, and connectivity devices associated with the storage network.

26. A method as in claim 25 further comprising:

initiating communication with a given agent of a corresponding host computer to identify a date and time associated with a detected change to the configuration.

27. A method as in claim 14 further comprising:

identifying a configuration change to the storage area network which includes a change associated with at least one of: i) the host computers, ii) the storage devices, and iii) the connectivity devices; and based on detecting the configuration change, notifying an appropriate client registered to be notified of an occurrence of the configuration change.

28. A method as in claim 14, wherein distributing the operation status information to a given client enables the given client to generate, on a corresponding user's display screen, a topology map identifying a configuration of resources associated with the storage area network.

29. A method as in claim 28, wherein providing the operation status information enables the given client to display a topology map illustrating connectivity of the storage systems, the host computers, and the connectivity devices associated with the storage network.

30. A method as in claim 29, wherein the corresponding user's display screen includes a sub-window listing storage arrays of the storage area-network accessible by the given client.

* * * * *

UNITED STATES PATENT AND TRADEMARK OFFICE
CERTIFICATE OF CORRECTION

PATENT NO. : 6,944,654 B1
DATED : September 13, 2005
INVENTOR(S) : Joseph Murphy and Ilya Lubovich It is certified that error appears in the above-identified patent and that said Letters Patent is hereby corrected as shown below:

Column 6,
Line 31, "servers" should read -- servers, --.
Line 31, "at least two one" should read -- at least one, --.

Column 8,
Line 50, "area-network" should read -- area network --.

Signed and Sealed this

Sixth Day of December, 2005

JON W. DUDAS
*Director of the United States Patent and Trademark Office*